Patented Dec. 15, 1953

2,662,886

UNITED STATES PATENT OFFICE 2,662,886

SUBSTITUTED PHENYLPROPYLAMINES

Arlo Wayne Ruddy, Morristown, N. J., Theodore J. Becker, deceased, late of Delmar, N. Y., by Maurice L. Tainter, administrator, Albany, N. Y., assignors to Winthrop-Stearns Inc., New York, N. Y., a corporation of Delaware No Drawing. Application January 28, 1949, Serial No. 73,443

20 Claims. (Cl. 260—293)

This invention relates to basic compounds and their salts which are useful as antispasmodic agents, and to intermediates used in preparing the same. More particularly it relates to compounds having the general structure:

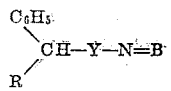

wherein R is an alkyl, alkenyl or cycloalkyl radical, Y is an ethylene group which may be substituted with alkyl groups, and —N=B represents a tertiary amino group, and to non-toxic salts thereof. This invention is a continuation-in-part of the copending application of A. W. Ruddy and T. J. Becker, Serial Number 651,046, now abandoned.

The purpose of antispasmodic agents is to relieve spasms of the smooth muscles. These spasms may be caused (1) by exaggerated impulses from the autonomic nervous system which create violet contractions in the muscle or (2) stimulation of the muscle by chemical changes in the surrounding tissues. Atropine has the ability of relieving the first type of spasms, and its action is therefore known as "neurotropic." Papaverine counteracts spasms of the second type and hence its action is "musculotropic."

The compounds have been studied for their ability to reduce spasms elicted in smooth muscle by barium chloride and acetylcholine in strips of rabbit ileum and by histamine in guinea pig ileum, and compared to atropine and papeverine for their neurotropic and musculotropic effects, respectively. These compounds have in general several times the musculotropic antispasmodic activity of papeverine without having increased toxicity over the latter. Furthermore, the compounds of this invention are characterized in general by moderate atropine-like action. However, they do not exhibit except to a very slight degree the often undesirable parasympathetic actions of atropine, such as mydriasis and central nervous system effects.

Compounds of the hereinabove disclosed formula, (C₆H₅)RCH—Y—N=B, may be conveniently synthesized through the intermediate carbinol (C₆H₅)RC(OH)—Y—N=B which is prepared by treating a ketone of the general structure C₆H₅—CO—Y—N=B, wherein the substituents have the meanings disclosed hereinabove, with an organometallic complex such as a Grignard reagents or an arylsodium compound having the formula RM, where R has the meaning given above and M represents a metal such as sodium or lithium or a halogen-metal group such as bormomagnesium. Alternatively, the ketone may have the structure R—CO—Y—N=B and the organometallic compound the formula C₆H₅M. Such reactions result in the formation of amino alcohols having the structure (C₆H₅)RC(OH)—Y—N=B The intermediate carbinols are disclosed and claimed in the copending application of A. W. Ruddy and T. J. Becker, Serial No. 73,442, filed January 28, 1949.

The following equation illustrates a representative overall reaction, that between cyclohexyl-magnesium bromide and beta-dimethylamino-butyrophenone and subsequent hydrolysis of the intermediate complex which is formed:

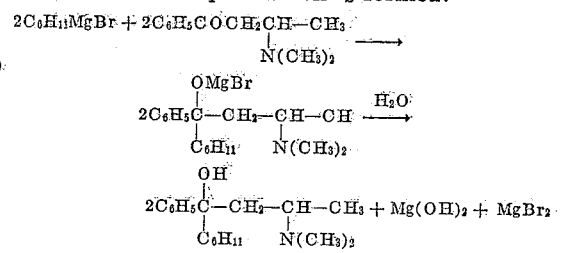

The amino alcohols may be reduced by a variety of methods, such as treatment with hydriodic acid and phosphorus, to amine of the formula (C₆H₅)RCH—Y—N=B, the groups having the same significance as above.

In the formulas above disclosed, R may represent cycloalkyl groups, such as cyclohexyl and cyclopentyl and simple hydrocarbon substituted products thereof; and alkyl and alkenyl groups of at least four and preferably between four and six carbon atoms, such as butyl, isobutyl, amyl, isoamyl, sec.-amyl, hexyl, isohexyl, butenyl, isobutenyl, pentenyl and hexenyl. Y represents a two-carbon chain which may bear alkyl substituents, such as one or more methyl or ethyl radicals, on either or both carbon atoms of the chain. It includes alkylene chains of the type

where X represents hydrogen or lower alkyl radicals. Such alkylene radicals having the free valence bonds only on adjacent carbon atoms may be termed alpha,beta-alkylene radicals; alpha indicating one of the carbon atoms in the above formula and beta indicating the adjacent carbon atom. The term "alpha,beta" distinguishes alkylene radicals of the above type from those in which the free valence bonds are not on adjacent carbon atoms of the radicals. The grouping —N=B represents an aliphatic amino group, —NR'R'', including dialkylamino groups, the component organic groups R' and R'' being if desired of different structure. The radicals R' and R'' together with the nitrogen atom may form a cyclic amino grouping such as piperidyl, morpholinyl, pyrrolidyl, piperazyl, thiamorpholinyl, and the like. Such cyclic amino groups may be considered aliphatic heterocyclic amino radicals, since they do not have complete, conjugate unsaturation, and do not exhibit aromatic properties (cf., Gilman, Organic Chemistry, 2d edition, vol. I, pp. 126–127, 1943), and behave like simple aliphatic amines.

In the synthesis of amino alcohols of the type hereinabove shown from ketones having the general structure C₆H₅—CO—Y—N=B or RCO—Y—N=B by reaction with an organometallic compound of the type RM or C₆H₅M respectively (the substituents having the meanings already given), the organometallic compound may be any of the usual forms which react with ketones to form tertiary alcohols. These types include the Grignard reagent, in which M stands for the group Mg-halogen; the alkyl- and aryl-sodium, -potassium or -lithium compounds, wherein M stands for Na, K, Li respectively; and related compounds. The amino ketones may be used as the free bases or as their salts, e. g., their hydrochlorides. When salts of the amino ketones are used, part of the organometallic compound is consumed by the acid, but this is not a serious disadvantage since an excess of the organometallic reagent is generally employed.

The amino ketones, which are the starting materials for the preparation of the amino alcohols and the amines which constitute our invention, may be synthesized by a variety of methods well understood by those skilled in the art. A simple method is based on the Mannich reaction and is illustrated by the preparation of beta-(diethylamino)-isopropyl cyclohexyl ketone from ethyl cyclohexyl ketone, formaldehyde and diethylamine hydrochloride.

A second method involves use of the Friedel-Crafts reaction of beta-(tertiary-amino)-acyl halides with aromatic compounds by the method of Dalmer et al. (German Patent 629,054). For example, beta-dimethylaminobutyric acid [Decombe, Ann. chim. (10), 18, 145 (1932)] is converted by treatment with thionyl chloride to its acid chloride hydrochloride and the latter condensed with benzene in the presence of aluminum chloride to form beta-dimethylaminobutyrophenone.

A third synthetic approach utilizes the addition of amines to alpha,beta-unsaturated ketones, forming beta-amino ketones. An example of this process is the addition of piperidine to crotonophenone to form beta-piperidylbutyrophenone.

The conversion of the tertiary amino alcohols of the type (C₆H₅)RCOH—Y—N=B into amines having the structure (C₆H₅)RCH—Y—N=B may be accomplished by several simple and generally applicable methods. The most direct is reduction with phosphorus and hydriodic acid. By this method the hydroxyl group is replaced by hydrogen in one operation. Another process is the dehydration of the tertiary amino alcohol to an unsaturated amine and the reduction of the latter to the desired amine. Suitable agents for the dehydration are acetic anhydride, benzoyl chloride, concentrated hydrochloric acid in glacial acetic acid, and concentrated sulfuric acid. The reduction is conveniently achieved by catalytic hydrogenation of either the amine or one of its salts. A third process of preparing the amine from the amino alcohol is by replacing the hydroxyl group by a halogen and reductively cleaving the latter. The halogenation is effected by such agents as acetyl chloride, thionyl chloride, phosphorus tribromide and the like. The reductive cleavage can be effected either by catalytic hydrogenolysis, preferably using a palladium catalyst or by chemical methods, such as by sodium in alcohol reduction.

The conversion of the amino alcohols to amines is illustrated by the following reactions which can be applied to any of the amino alcohols disclosed herein:

By treatment with phosphorus and hydriodic acid in glacial acetic acid 1-cyclohexyl-1-phenyl-2-methyl-3-dibutylamino-1-propanol is converted to 1-cyclohexyl-1-phenyl-2-methyl - 3 - dibutylaminopropane; and 1-phenyl-1-cyclohexyl-2,2-dimethyl-3-(N - piperidyl)-1-propanol is converted to 1-phenyl-1-cyclohexyl-2,2-dimethyl-3-(N-piperidyl)-propane.

It is not necessary to proceed through the carbinol intermediate to prepare the compounds of this invention. An often more convenient process, having the further advantage of often giving better yields, comprises successively alkylating phenylacetonitrile (benzylcyanide) and finally cleaving off the cyano group, thereby replacing it by hydrogen. Thus, alkylation of phenylacetonitrile with a cycloalkyl, alkyl or alkenyl halide gives a compound of the formula (C₆H₅)RCHCN. This is further alkylated with a tertiary-aminoalkyl halide to give (C₆H₅)RC(CN)—Y—N=B. Treatment of this nitrile with sodium amide gives the desired product (C₆H₅)RCH—Y—N=B. There is no need for the alkylations to take place in the order given, although it is preferred to introduce the aminoalkyl group last, since possible side reactions are thereby minimized. For example, phenylacetonitrile is condensed with isobutyl bromide in the presence of sodium amide to give phenylisobutylacetonitrile. The latter when condensed with N-piperidylethyl chloride under similar conditions gives phenylisobutyl-(N-piperidylethyl) - acetonitrile. Cleavage of the cyano group, thereby replacing it by hydrogen, is effected by heating the trisubstituted nitrile with sodium amide, thus producing N-(5-methyl-3-phenylhexyl)-piperidine.

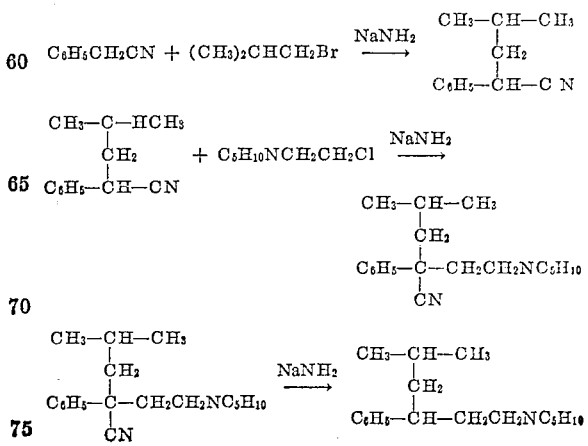

Examples of organic halides which may be used to introduce the group R into the alpha-position of phenylacetonitrile include n-butyl halide, isobutyl halide, sec.-butyl halide, tert.-butyl halide, n-amyl halide, isoamyl halide, active-amyl halide, n-hexyl halide, isohexyl halide, 2-methylpentyl halide, methallyl halide, 2-butenyl halide, 3-butenyl halide, 2-pentenyl halide, 3-pentenyl halide, 2-hexenyl halide, 3-hexenyl halide, cyclopentyl halide, cyclohexyl halide, etc. The halogen atoms may be chlorine, bromine or iodine.

When it is desired to introduce an alkenyl group which has a double bond in the vinyl position with respect to the alpha-carbon of the substituted acetonitrile, a variation in synthesis must be employed because of the unreactivity of vinyl and substituted vinyl halides. This can be accomplished, however, by condensation of phenylacetonitrile with an aldehyde or ketone by the general method of Murray and Cloke, J. Am. Chem. Soc. 58, 2016 (1936) to give an alkylidenephenylacetonitrile. This may be alkylated with a tertiary-aminoalkyl halide, the double bond then shifting into the vinyl position. For example, condensation of isobutyraldehyde with phenylacetonitrile gives isobutylidenephenylacetonitrile, which in turn can be alkylated with beta-(N-piperidylethyl)-chloride.

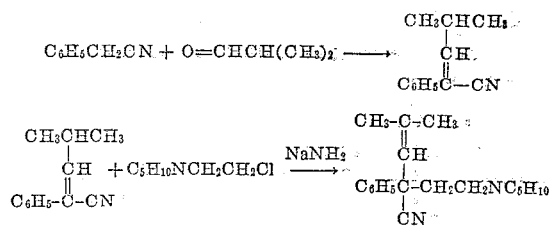

The alpha-substituent of the substituted phenylacetonitrile, —Y—N=B, is introduced by alkylation using the halide, Hal-Y—N=B. Examples of the compounds Hal-Y—N=B which may be used for alkylation of the substituted phenylacetonitriles include beta-dimethylaminoethyl chloride, beta - ethyl - methylaminoethyl chloride, beta-diethylaminoethyl bromide, alpha-methyl-beta-diethylaminoethyl chloride, beta-dipropylaminoethyl iodide, beta-dibutylaminoethyl chloride, beta-(N-piperidyl)-ethyl chloride, beta-(N-pyrrolidyl)-ethyl chloride, beta-(N-morpholinyl)-ethyl chloride, etc. When used, for example, to alkylate isobutyl-phenylacetonitrile, the above named aminoalkyl halides give the following nitriles respectively: isobutyl-beta - dimethylaminoethyl - phenylacetonitrile, isobutyl - beta- ethylmethylaminoethyl - phenylacetonitrile, isobutyl - beta- diethylaminoethyl-phenylacetonitrile, isobutyl-(alpha-methyl-beta-diethylamino) - ethyl - phenylacetonitrile, isobutyl - beta - dipropylamino - ethyl - phenylacetonitrile, isobutyl - beta - dibutylaminoethyl-phenylacetonitrile, isobutyl-beta-(N-piperidyl)-ethyl-phenylacetonitrile, isobutyl-beta-(N-pyrrolidyl)-ethyl-phenylacetonitrile, and isobutyl-(N-morpholinyl)-ethyl-phenylacetonitrile.

When the above named nitriles are treated with sodium amide to replace the cyano group by hydrogen, the following amines are produced respectively: N,N-dimethyl-3-phenyl-5-methylhexylamine; N - ethyl - N - methyl - 3 - phenyl-5 - methylhexylamine; N, N - diethyl - 3 - phenyl-5 - methylhexylamine; N,N - diethyl - 3- phenyl-2,5 - dimethylhexylamine; N,N - dipropyl - 3 - phenyl - 5 - methylhexylamine; N,N - dibutyl - 3 - phenyl - 5 - methylhexylamine; N - (3 - phenyl - 5 - methylhexyl) - piperidine; N - (3 - phenyl - 5 - methylhexyl) - pyrrolidine; and N - (3 - phenyl - 5 - methylhexyl) - morpholine.

In the case of compounds wherein R is a cyclohexyl radical, a variation of the nitrile synthesis may be used. Alkylation of diphenylacetonitrile with a tertiary-aminoalkyl halide produces a nitrile of the formula

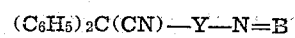

$$(C_6H_5)_2C(CN)—Y—N=B$$

After replacement of the cyano group with hydrogen by use of sodium amide, one of the phenyl groups is selectively hydrogenated catalytically to a cyclohexyl radical, giving

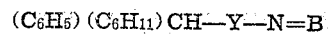

$$(C_6H_5)(C_6H_{11})CH—Y—N=B$$

Alternatively, diphenylmethane is alkylated with an aminoalkyl halide in the presence of a strong base, such as sodium phenyl, as a condensing agent. This gives the diphenylpropylamine directly which is then selectively hydrogenated to the phenylcyclohexyl derivative.

When used as pharmacological agents, these compounds are ordinarily used in the form of water-soluble salts, acid-addition salts derived from inorganic or organic acids, or quaternary salts obtained by addition of alkyl or aralkyl esters of inorganic acids, the anions of which are non-toxic and otherwise innocuous to the animal organism at the dosage levels required for therapeutic results. Examples of such salt forming substances include hydrochloric acid, hydrobromic acid, hydriodic acid, sulfuric acid, citric acid, tartaric acid, lactic acid, sulfamic acid, ethanesulfonic acid, etc.

The quaternary ammonium salts of the basic nitriles, $(C_6H_5)RC(CN)—Y—N=B$, and the tertiary amines, $(C_6H_5)RCH—Y—N=B$, are derived from addition of alkyl or aralkyl esters of inorganic acids or certain strong organic acids such as sulfonic acids. Such salt-forming substances include methyl chloride, methyl bromide, methyl iodide, ethyl chloride, ethyl bromide, ethyl iodide, propyl chloride, propyl bromide, propyl iodide, isopropyl bromide, butyl chloride, butyl bromide, isobutyl bromide, sec.-butyl bromide, n-amyl bromide, n-hexyl chloride, benzyl chloride, benzyl bromide, methyl sulfate, ethyl sulfate, methyl benzenesulfonate, methyl p - toluenesulfonate, etc., which will react directly with any of the above named basic nitriles or tertiary amines to give respectively the methochloride, methobromide, methiodide, ethochloride, ethobromide, ethiodide, propochloride, propobromide, propiodide, isopropobromide, butochloride, butobromide, isobutobromide, sec.-butobromide, n-amobromide, n-hexochloride, benzochloride, benzobromide, methosulfate, ethosulfate, methobenzenesulfonate, metho-p-toluenesulfonate, etc.

The quaternaries are generally prepared by warming the free base with an excess of the salt-forming ester in an inert organic medium such as benzene or ether. The quaternary ammonium salt will separate, usually as a crystalline product, or can be made to precipitate by the addition of other solvents or by concentration of the solution.

Alternatively, it is possible by use of metathetical reactions to replace the anion of a quaternary by a different anion without reconversion to the free base. This is usually effected by treatment of a solution of the quaternary, QX, with silver oxide (hydroxide). The silver salt, AgX, is precipitated leaving in solution the quaternary hydroxide, QOH. It is prerequisite, of course, that the salt AgX be insoluble in water. The quaternary hydroxide may then be neutralized with the appropriate acid to give any desired salt. For example, methiodides are generally easier to prepare by direct addition than methochlorides. Methyl iodide reacts more readily and is more convenient to use than methyl chloride. However, the methochloride may be readily prepared from the methiodide by the method just described. Treatment of a solution of the methiodide with silver oxide precipitates silver iodide leaving a solution of the quaternary hydroxide. Neutralization of this solution with hydrochloric acid gives the methochloride which can be obtained by concentration of the solution.

The following examples will illustrate my invention more completely but should not be construed as a limitation thereto.

*Example 1*

(a) 1 - phenyl - 1 - cyclohexyl - 2 - methyl - 3-(N-piperidyl)-1-propanol:

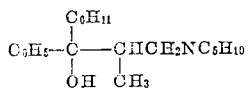

To a cold solution of cyclohexylmagnesium bromide, prepared from 193 g. (1.186 moles) of cyclohexyl bromide, 32.2 g. (1.326 moles) of magnesium and 600 cc. of anhydrous ether, was added in one and one-half hours at 0° C. 111 g. (0.479 mole) of alpha-(piperidylmethyl)-propiophenone in 380 c. of dry benzene. After the addition, the reaction mixture was warmed to 73° C. while the ether was removed by distillation over a period of two and one-half hours and then added to ice containing 170 cc. of concentrated hydrochloric acid. Ammonium chloride (100 g.) and 350 cc. of 28% ammonium hydroxide were added and the organic layer was separated. The aqueous layer was extracted with ether and the combined extracts were dried with anhydrous sodium sulfate. The solvent was removed and the residue distilled in vacuo. The base distilled at 180–195° C. (1 mm.) and solidified in the receiver. Recrystallization from methanol yielded 133 g. of base having M. P. 116–117° C. The hydrochloride was formed by adding dry ether to an absolute alcoholic solution of the base containing excess hydrogen chloride and melted at 259° C. with decomposition.

Anal. Calcd. for C₂₁H₃₄ONCl: Cl, 10.07; N, 3.98. Found: Cl, 10.12; N, 4.08.

(b) N - (3 - phenyl - 3 - cyclohexyl - 2 - methylpropyl) - piperidine:

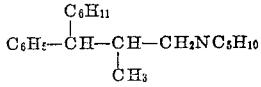

A mixture of 221 g. of 1-phenyl-1-cyclohexyl-2 - methyl - 3 - (N - piperidyl) - 1 - propanol, 27.9 g. of red phosphorus, 210 cc. of 47% hydriodic acid and 550 cc. of glacial acetic acid was refluxed for three hours. The reaction mixture was filtered through a sintered glass funnel, the funnel was washed with hot glacial acetic acid and the combined filtrates were treated with a small amount of sodium bisulfite and slowly diluted with 1400 cc. of warm water and chilled. The hydroiodide of the product crystallized out and was removed by filtration and washed with water. It was suspended in water, made alkaline with a solution of 60 g. of sodium hydroxide and stirred with ether for several hours. The ether which contained the free base was separated, the aqueous layer was extracted with more ether and the combined extracts dried over anhydrous sodium sulfate. The ether was then evaporated and the residue distilled giving 173 g. (85%) of N - (3 - phenyl - 3 - cyclohexyl - 2 - methylpropyl)-piperidine, B. P. 158–164° C. (1 mm.); $n_D^{25}$=1.5364.

The free base was converted to its hydrochloride by dissolving in 95 cc. of anhydrous alcohol and neutralizing to Congo red with 105 cc. of 20% alcoholic hydrogen chloride. Upon addition of 700 cc. of anhydrous ether, one racemate of the hydrochloride precipitated, giving 52.4 g., M. P. 223–225° C. (dec.).

Anal. Calcd. for C₂₁H₃₄NCl: Cl, 10.55; N, 4.17. Found: Cl, 10.60; N, 4.02.

After concentration of the filtrate a second crop of crystals was obtained, 17.3 g., M. P. 216° (dec.). The remaining mother liquors were evaporated and the crystalline residue, 30.6 g., M. P. 170–176° C. was recrystallized from ethyl acetate, giving a sample of the other racemate of the hydrochloride of N-(3-phenyl-3-cyclohexyl-2-methylpropyl)-piperidine, M. P. 178–180° C.

Anal. Calcd. for C₂₁H₃₄NCl: Cl, 10.55; N, 4.17. Found: Cl, 10.68; N, 4.07.

*Example 2*

(a) 1-phenyl - 1 - cyclohexyl-2-(N-piperidylmethyl)-1-butanol was prepared according to the method of Example 1, part (a) starting with 115.2 g. of alpha-(N-piperidylmethyl)-butyrophenone, B. P. 124–126° C. (1 mm.), and 189 g. of cyclohexyl bromide. The free base had the B. P. 175–185° C. (1 mm.) and the M. P. 86–87° C. Its hydrochloride had the M. P. 237–238.5° C.

Anal. Calcd. for C₂₂H₃₆ONCl: C, 72.20; H, 9.92; N, 3.85. Found: C, 72.20; H, 10.23; N, 4.09.

(b) N-(3-phenyl-3-cyclohexyl-2-ethylpropyl)-piperidine:

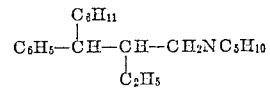

A mixture of 65.8 g. of 1-phenyl-1-cyclohexyl-2-(N-piperidylmethyl)-1-butanol, 10 g. of red phosphorus, 70 cc. of 47% hydriodic acid and 200 cc. of glacial acetic acid was caused to react in the manner described in Example 1, part (b). The crude basic product was converted directly to its hydrochloride and crystallized from an alcohol-ether mixture. The first crop, about 12 g., had the M. P. 198–202° C. which, when recrystallized from sec.-butyl alcohol using ether as a precipitant, gave a sample of one of the racemates of the hydrochloride of N-(3-phenyl-3-cyclohexyl - 2 - ethylpropyl) - piperidine, M. P. 211.5–213° C.

Anal. Calcd. for C₂₂H₃₆NCl: Cl, 10.13; N, 4.00. Found: Cl, 10.00; N, 4.04.

The other racemate was obtained in the following manner: the mother liquors from the original first crop of hydrochloride were evaporated, and the residue was recrystallized from sec.-butyl alcohol using ether as a precipitant. A first crop of 7 g., M. P. 145–180° C. was obtained, and, upon concentration, a second crop of 31 g., M. P. 138–145° C. When this second crop was recrystallized from ethyl acetate, 22.5 g., M. P. 145–151° C., was obtained. Careful fractional crystallization of this product from toluene using ether as a precipitant gave 8 g. of the other racemate of the hydrochloride of N-(3-phenyl-3-cyclohexyl-2-ethylpropyl) - piperidine, M. P. 148.5–150° C.

Anal. Calcd. for C₂₂H₃₆NCl: Cl, 10.13; N, 4.00. Found: Cl, 10.16; N, 3.85.

*Example 3*

(a) Phenylisobutylacetonitrile: Benzyl cyanide (293 g.) was added gradually to a stirred suspension of 115 g. of sodium amide in 250 cc. of dry benzene at 40-50° C. The mixture was stirred at 50° C. for one and one-half hours, cooled to 25° C., and 343 g. of isobutyl bromide was added. After heating for an additional two hours at 65° C., the mixture was cooled and the excess sodium amide was hydrolyzed by addition of alcohol and water. The organic layer was separated and washed with dilute hydrochloric acid and water and dried over anhydrous sodium sulfate. The product was then fractionated and refractionated through a heated column, packed with glass helices, and the product, B. P. 80-90° C. (0.5 mm.), $n_D^{25}$=1.4978-85, was collected.

(b) Phenylisobutyl - (N - piperidylethyl)-acetonitrile:

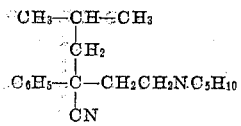

A stirred suspension of 18 g. of sodium amide in a solution of 26 g. of phenylisobutylacetonitrile in 200 cc. of dry benzene was heated to 65° C. for a few minutes. The mixture was then cooled to about 30° C., and 27.6 g. of N-piperidylethyl chloride hydrochloride was added. After refluxing for two hours, the mixture was cooled and the excess sodium amide was hydrolyzed by addition of alcohol and water. The organic layer was separated and washed with water and dried over anhydrous sodium sulfate. The product was distilled at reduced pressure giving 34 g. (80%) of phenylisobutyl-(N-piperidylethyl) - acetonitrile, B. P. 136-142° (0.04 mm.), $n_D^{25}$=1.5140.

Its hydrochloride had the M. P. 193-195° C. (dec.).

Anal. Calcd. for C₁₉H₂₉N₂Cl: C, 71.11; H, 9.11; N, 8.73. Found: C, 71.16; H, 9.00; N, 8.65.

Its methiodide, prepared by heating a sample of the free base with an excess of methyl iodide in benzene solution and recrystallization from ethyl acetate, had the M. P. 171-173° C.

Anal. Calcd. for C₂₀H₃₁N₂I: C, 56.33; H, 7.33; I, 29.77. Found: C, 56.55; H, 7.33; I, 29.62.

(c) N-(5-methyl-3-phenylhexyl)-piperidine:

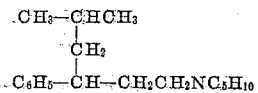

A stirred suspension of 25 g. of sodium amide in 100 cc. of dry xylene was heated to reflux, and 26 g. of phenylisobutyl-(N-piperidylethyl)-acetonitrile was slowly added over a period of one hour. The mixture was refluxed and stirred for ten hours, then cooled and 100 cc. of water was added to hydrolyze excess sodium amide. The organic layer was separated and the aqueous layer extracted with ether which was then combined with the original organic layer. The combined extracts were washed twice with water (which was discarded), and then with a solution of 100 cc. of concentrated hydrochloric acid in 100 cc. of water, and finally twice with water. The combined acid solutions, which contained the hydrochloride of the desired product, were shaken twice with ether and then made alkaline with 35% sodium hydroxide. The liberated free base was extracted with ether, dried over sodium hydroxide pellets and distilled giving 21.3 g. (90%) of N-(5-methyl-3-phenylhexyl)-piperidine, B. P. 103-107° C. (0.25 mm.), $n_D^{25}$=1.5035.

The hydrochloride was prepared by dissolving the free base in alcoholic hydrogen chloride and precipitating with anhydrous ether. It was obtained in about 90% yield and had the M. P. 203-205° C. A purer product was obtained by recrystallization from isopropyl alcohol giving a sample with the M. P. 206-207° C.

Anal. Calcd. for C₁₈H₃₀NCl: C, 73.06; H, 10.22; N, 4.73. Found: C, 73.32; H, 9.97; N, 4.60.

N - (5-methyl-3-phenylhexyl)-piperidine was converted to its methiodide in the following manner: a solution of 15.6 g. of the free base and 12.6 g. of methyl iodide in dry benzene was warmed until an oil separated. This was induced to crystallize by diluting with an equal volume of ethyl acetate, filtered, washed with ethylacetate and dried, giving 22 g. (92%), M. P. 102-103° C. Recrystallization from an ethyl acetate-methanol mixture gave a pure sample of the methiodide, M. P. 103-104.5° C.

Anal. Calcd. for C₁₉H₃₂NI: C, 56.85; H, 8.04; I, 31.62. Found: C, 57.08; H, 7.91; I, 31.60.

*Example 4*

(a) Phenylcyclohexyl - (N - piperidylethyl)-acetonitrile:

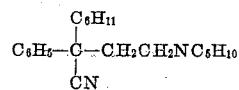

A stirred suspension of 50 g. of sodium amide in a solution of 216.2 g. of phenylcyclohexylacetonitrile (Organic Syntheses 25, 25) in 200 cc. of dry benzene, was heated to 65° C. for a few minutes. The mixture was then cooled to about 30° C. and 162.5 g. of N-piperidylethyl chloride was added. After refluxing for two hours, the mixture was cooled and the excess sodium amide was hydrolyzed by addition of alcohol and water. The organic layer was separated and washed with water and dried over anhydrous sodium sulfate. The product was distilled at reduced pressure giving 246 g. of phenylcyclohexyl-(N-piperidylethyl)-acetonitrile, $n_D^{25}$=1.5345.

Its hydrochloride, prepared from the free base and alcoholic hydrogen chloride, had the M. P. 230-232° C. (dec.).

Anal. Calcd. for C₂₁H₃₁N₂Cl: N, 8.08; Cl, 10.22. Found: N, 8.12; Cl, 9.96.

(b) N - (3-phenyl-3-cyclohexylpropyl)-piperidine:

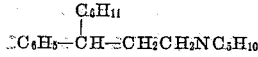

was prepared by a method analogous to that described in Example 3, part (c). Phenylcyclohexyl-(N-piperidylethyl)-acetonitrile (155.3 g.) and a suspension of 80 g. of sodium amide in 500 cc. of xylene gave a product, B. P. 132-137° C. (0.05 mm.), $n_D^{25}$=1.5274. When converted to its hydrochloride by the alcoholic hydrogen chloride-ether method, 145 g. of product, M. P. 225-226° C. was obtained. Recrystallization of this from an alcohol-ethyl acetate mixture gave 130 g. of the hydrochloride of N - (3 - phenyl-3-cyclohexylpropyl)-piperidine, M. P. 227-228° C.

Anal. Calcd. for C₂₀H₃₂NCl: N, 4.35; Cl, 11.01. Found: N, 4.31; Cl, 10.97.

*Example 5*

(a) N - (3,3 - diphenylpropyl)-piperidine (see Bockmuhl et al., U. S. Pat. 2,446,522): A mixture of 336 g. of diphenylmethane and 235 g. of chlorobenzene was introduced drop by drop, while stirring, into 100 cc. of benzene containing 101 g. of finely cut sodium wire. The temperature was kept at about 35° C. by occasional cooling. After about seven to eight hours the reaction was finished. Thereupon, 240 g. of N-piperidylethyl chloride was added dropwise, the whole was stirred for one hour at room temperature and finally heated for one hour under reflux. The mixture was then cooled, water added, the benzene layer separated and extracted with dilute hydrochloric acid. The acid solutions were made alkaline with sodium hydroxide solution, and the free base which separated was extracted with ether and distilled at reduced pressure, giving an oil boiling at 210–220° C. (8 mm.). Its hydrochloride had the M. P. 214–215° C.

(b) N - (3-phenyl-3-cyclohexylpropyl)-piperidine: A solution of 19.6 g. of N-(3,3-diphenylpropyl)-piperidine in 150 cc. of glacial acetic acid was shaken with 0.5 g. of Adams platinum oxide catalyst at room temperature in an atmosphere of hydrogen at 60 lbs. pressure. After about a day no additional uptake of hydrogen was observed. Distillation of the product gave 16.9 g. of N-(3-phenyl-3-cyclohexylpropyl)-piperidine, B. P. 160–167° C. (0.75 mm.). The hydrochloride had the same melting point as the product of Example 4, part (b) and a mixed melting point showed no depression.

*Example 6*

(a) Phenylcyclohexyldimethylaminoacetonitrile,

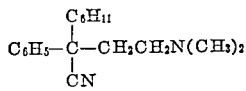

was prepared by a method similar to that described in Example 4, part (a). The reaction of 101.6 g. of phenylcyclohexylacetonitrile, 55.9 g. of dimethylaminoethyl chloride and 23.3 g. of sodium amide gave 85.9 g. (62%) of phenylcyclohexyldimethylaminoacetonitrile, B. P. 165–173° C. (2 mm.), $n_D^{25}=1.5242$.

Its hydrochloride, prepared from the free base and alcoholic hydrogen chloride, had the M. P. 229–230° C.

Anal. Calcd. for $C_{18}H_{27}N_2Cl$: N, 9.13; Cl, 11.55. Found: N, 9.01; Cl, 11.58.

(b) 3 - phenyl - 3 - cyclohexylpropyldimethylamine,

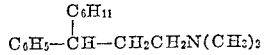

was prepared by a method similar to that described in Example 3, part (c). The reaction of 40.5 g. of phenylcyclohexyldimethylaminoacetonitrile and 25 g. of sodium amide gave 31.2 g. (85%) of 3-phenyl-3-cyclohexylpropyldimethylamine, B. P. 105–124° C. (0.25 mm.), $n_D^{25}=1.5150$.

The hydrochloride was prepared by the usual alcoholic hydrogen chloride-ether procedure; 31.2 g. of free base gave 28.3 g. of the hydrochloride, M. P. 151–154° C. Recrystallization from alcohol, using ether as a precipitant, gave a pure sample of the hydrochloride, M. P. 154.5–156° C.

Anal. Calcd. for $C_{17}H_{28}NCl$: N, 4.97; Cl, 12.58. Found: N, 4.91; Cl, 12.44.

*Example 7*

(a) Phenylcyclohexyl - (N - pyrrolidylethyl)-acetonitrile,

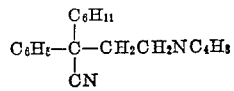

was prepared by a method similar to that described in Example 4, part (a). The reaction of 139.5 g. of phenylcyclohexylacetonitrile, 83.5 g. of N-pyrrolidylethyl chloride and 40 g. of sodium amide gave 193 g. of crude basic product which was used directly in the next reaction.

The hydrochloride of phenylcyclohexyl-(N-pyrrolidylethyl)-acetonitrile has the M. P. 194.5–196° C.

Anal. Calcd. for $C_{20}H_{29}N_2Cl$: Cl, 10.65; N, 8.42. Found: Cl, 10.61; N, 8.31.

(b) N-(3-phenyl-3-cyclohexylpropyl)-pyrrolidine,

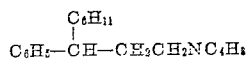

was prepared by a method similar to that described in Example 3, part (c). The reaction of 59.4 g. of phenylcyclohexyl-(N-pyrrolidylethyl)-acetonitrile and 40 g. of sodium amide gave 41 g. of N-(3-phenyl-3-cyclohexylpropyl)-pyrrolidine, B. P. 126–130° C. (0.1 mm.), $n_D^{25}=1.5278$.

The hydrochloride was prepared by the usual alcoholic hydrogen chloride-ether procedure; 26.8 g. of the free base gave 22.2 g. of hydrochloride, M. P. 181–182.5° C. Recrystallization from acetone, using ether as a precipitant, gave a pure sample of the hydrochloride, M. P. 181.5–183° C.

Anal. Calcd. for $C_{19}H_{30}NCl$: C, 74.11; H, 9.82; Cl, 11.51. Found: C, 74.33; H, 9.66; Cl, 11.38.

*Example 8*

(a) Phenylcyclohexyldiethylaminoacetonitrile,

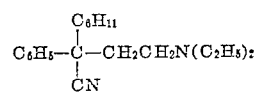

was prepared by a method similar to that described in Example 4, part (a). The reaction of 207.3 g. of phenylcyclohexylacetonitrile, 144.4 g. of diethylaminoethyl chloride and 48.4 g. of sodium amide gave 256 g. (82%) of phenylcyclohexyldiethylaminoacetonitrile, B. P. 174–182° C. (2 mm.), $n_D^{25}=1.5187$.

Its hydrochloride had the M. P. 157–158° C.

Anal. Calcd. for $C_{20}H_{31}N_2Cl$: N, 8.37; Cl, 10.59. Found: N, 8.36; Cl, 10.60.

Its methiodide had the M. P. 169–170° C.

Anal. Calcd. for $C_{21}H_{33}N_2I$: C, 57.26; H, 7.55; N, 6.36; I, 28.82. Found: C, 57.09; H, 7.34; N, 6.22; I, 28.35.

(b) 3-phenyl-3-cyclohexylpropyldiethylamine,

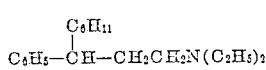

was prepared by a method similar to that described in Example 3, part (c). The reaction of 59.7 g. of phenylcyclohexyldiethylaminoacetonitrile and 31.2 g. of sodium amide gave 45.2 g. (82%) of 3-phenyl-3-cyclohexylpropyldiethylamine, B. P. 150–163° C. (1.5 mm.), $n_D^{25}=1.5120$.

The hydrochloride was prepared by the usual alcoholic hydrogen chloride-ether procedure. The crude product when crystallized twice from anhydrous alcohol using anhydrous ether as a precipitant, gave a pure sample of the hydrochloride, M. P. 125.5–127° C.

Anal. Calcd. for $C_{19}H_{32}NCl$: Cl, 11.45; N, 4.52. Found: Cl, 11.32; N, 4.45.

Example 9

(a) Phenylisobutyldiethylaminoethylacetonitrile,

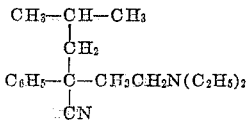

was prepared by a method similar to that described in Example 4, part (a). The reaction of 86.7 g. of phenylisobutylacetonitrile (Example 3, part (a)), 65 g. of diethylaminoethyl chloride and 50 g. of sodium amide gave 110 g. of phenylisobutyldiethylaminoethylacetonitrile, B. P. 114–118° C. (0.05 mm.), $n_D^{25}$=1.4960.

Its hydrochloride had the M. P. 133–134° C.

Anal. Calcd. for $C_{18}H_{29}N_2Cl$: N, 9.07; Cl, 11.48. Found: N, 9.09; Cl, 11.42.

Its methiodide had the M. P. 155.5–157° C.

Anal. Calcd. for $C_{19}H_{31}N_2I$: N, 6.76; I, 30.63. Found: N, 6.72; I, 30.60.

Its benzochloride was prepared as follows: A mixture of 19.1 g. of phenylisobutyldiethylaminoethylacetonitrile, 9.9 g. of benzyl chloride and 75 ml. of ethyl acetate was heated on a steam bath for three hours. Then part of the ethyl acetate was evaporated and ether added whereupon a crystalline solid precipitated. This suspension was collected by filtration, and the resulting benzochloride of phenylisobutyldiethylaminoethylacetonitrile was recrystallized from a methanol-ether mixture giving 6.7 g., M. P. 162–164° C. (uncorrected).

Its ethobromide was prepared as follows: A mixture of 19.1 g. of the nitrile and 33 g. of ethyl bromide was heated at about 50° C. for ten days. The excess of ethyl bromide was evaporated and the residue was recrystallized from an acetone-ether mixture giving the ethobromide of phenylisobutyldiethylaminoethylacetonitrile, M. P. 135.5–137° C. (uncorr.).

(b) N,N - diethyl - 5 - methyl-3-phenylhexylamine,

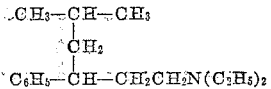

was prepared by a method similar to that described in Example 3, part (c). The reaction of 54.4 g. of phenylisobutyldiethylaminoethylacetonitrile and 45 g. of sodium amide gave 45 g. (91%) of N,N-diethyl-5-methyl-3-phenylhexylamine, B. P. 126–132° C. (4 mm.), $n_D^{25}$=1.4852.

The hydrochloride was prepared by the usual alcoholic hydrogen chloride-ether procedure; 24.7 g. of the free base gave 22.3 g. of the hydrochloride, M. P. 101–102° C. Recrystallization from ethyl acetate gave a pure sample of the hydrochloride, M. P. 105–106° C.

Anal. Calcd. for $C_{17}H_{30}NCl$: C, 71.93; H, 10.65; Cl, 12.49. Found: C, 72.12; H, 10.58; Cl, 12.30.

N,N - diethyl-5-methyl - 3 - phenylhexylamine was converted to its methiodide by the method described in Example 3, part (c); 14.5 g. of the free base and 12.6 g. of methyl iodide gave 21.3 g. of methiodide, M. P. 111–113° C. Recrystallization from a methanol-ethyl acetate mixture gave a pure sample of the methiodide, M. P. 114.5–117° C.

Anal. Calcd. for $C_{18}H_{32}NI$: 55.52; H, 8.28; I, 32.60. Found: C, 55.57; H, 8.23; I, 32.56.

Example 10

(a) Phenylisobutyldimethylaminoethylacetonitrile,

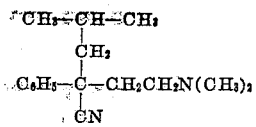

was prepared by a method similar to that described in Example 4, part (a). The reaction of 86.7 g. of phenylisobutylacetonitrile, 54 g. of dimethylaminoethyl chloride and 30 g. of sodium amide gave 71.6 g. of phenylisobutyldimethylaminoethylacetonitrile, B. P. 112–120° C. (0.4 mm.); $n_D^{25}$=1.5020.

Its hydrochloride had the M. P. 242–243° C.

Anal. Calcd. for $C_{16}H_{25}N_2Cl$: C, 68.43; H, 8.97; Cl, 12.63. Found: C, 68.56; H, 9.07; Cl, 12.53.

Its methiodide had the M. P. 150.5–152.5° C.

Anal. Calcd. for $C_{17}H_{27}N_2I$: N, 7.25; I, 32.85. Found: N, 7.14; I, 33.25.

(b) N,N,5-trimethyl-3-phenylhexylamine,

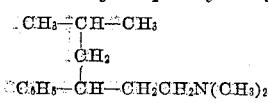

was prepared by a method similar to that described in Example 3, part (c). The reaction of 48.9 g. of phenylisobutyldimethylaminoethylacetonitrile and 40 g. of sodium amide gave 39.5 g. (90%) of N,N-dimethyl-5-methyl-3-phenylhexylamine, B. P. 71–75° C. (0.3 mm.);

$$n_D^{25}=1.4872$$

The hydrochloride was prepared by the usual alcoholic hydrogen chloride-ether procedure; 21.9 g. of the free base gave 21 g. of hydrochloride, M. P. 134–135° C. Recrystallization from ethyl acetate gave a pure sample of the hydrochloride, M. P. 136–137° C.

Anal. Calcd. for $C_{15}H_{26}NCl$: C, 70.42; H, 10.24; Cl, 13.86. Found: C, 70.57; H, 10.36; Cl, 13.57.

N,N-5-trimethyl-3-phenylhexylamine was converted to its methiodide by the method described in Example 3, part (c); 13.1 g of the free base and 14 g. of methyl iodide gave 20.3 g. of crude methiodide. Recrystallization from benzene gave a pure sample of the methiodide, M. P. 109–111° C.

Anal. Calcd. for $C_{16}H_{28}NI$: C, 53.18; H, 7.81; I, 35.13. Found: C, 53.30; H, 7.69; I, 34.86.

Example 11

(a) Phenylcyclopentylacetonitrile was prepared from benzyl cyanide and cyclopentyl bromide by a procedure analogous to that described in Organic Syntheses, vol. 25, p. 25 for phenylcyclohexylacetonitrile. It was obtained in about 57% yield, B. P. 101–107° C. (0.05–0.5 mm.);

$$n_D^{25}=1.5265-80$$

(b) Phenylcyclopentyldimethylaminoethylacetonitrile,

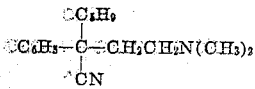

was prepared by a method similar to that described in Example 4, part (a). The reaction of 64.8 g. of phenylcyclopentylacetonitrile, 37.7 g. of dimethylaminoethyl chloride and 20 g. of sodium amide gave 66 g. of phenylcyclopentyldimethylaminoethylacetonitrile, B. P. 134–141° C. (1.0 mm.); $n_D^{25}$=1.5210.

Its hydrochloride had the M. P. 184–186° C.

Anal. Calcd. for $C_{17}H_{25}N_2Cl$: C, 69.72; H, 8.61; Cl, 12.11. Found: C, 69.55; H, 8.68; Cl, 12.08.

(c) N,N-dimethyl-3-phenyl-3-cyclopentylpropylamine,

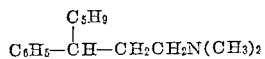

was prepared by a method similar to that described in Example 3, part (c). The reaction of 50.4 g. of phenylcyclopentyldimethylaminoethylacetonitrile and 40 g. of sodium amide gave 37 g. of N,N-dimethyl-3-phenyl-3-cyclopentylpropylamine, B. P. 103–108° C. (0.25 mm.);

$$n_D^{25}=1.5095$$

The hydrochloride was prepared by the usual alcoholic hydrogen chloride-ether procedure; 18.7 g. of the free base gave 20.4 g. of hydrochloride, M. P. 134–136° C. Recrystallization from anhydrous alcohol using ether as a precipitant gave a pure sample of the hydrochloride, M. P. 137–139° C.

Anal. Calcd. for $C_{16}H_{26}NCl$: C, 71.75; H, 9.79; Cl, 13.24. Found: C, 71.46; H, 9.82; Cl, 13.33.

N,N-dimethyl-3-phenyl-3-cyclopentylpropylamine was converted to its methiodide by the method described in Example 3, part (c); 10.5 g. of the free base and 14 g. of methyl iodide gave 16.8 g. of the methiodide, M. P. 129–132° C. Recrystallization from ethyl acetate containing a trace of ethanol gave a pure sample of the methiodide, M. P. 134.5–136.5° C.

Anal. Calcd. for $C_{17}H_{28}NI$: C, 54.69; H, 7.56; I, 34.00. Found: C, 54.60; H, 7.46; I, 33.80.

*Example 12*

(a) Alpha-phenylcaprylonitrile was prepared by a method similar to that used for the preparation of phenylisobutylacetonitrile, described in Example 3, part (a). The reaction of 292.5 g. of benzylcyanide, 406 g. of n-hexyl bromide and 115 g. of sodium amide gave a crude product which, when fractionally distilled at reduced pressure, gave 310 g. (60%) of alpha-phenylcaprylonitrile, B. P. 95–107° C. (0.1–0.2 mm.), $n_D^{25}=1.4955$.

(b) Phenyl-(n-hexyl)-diethylaminoethylacetonitrile,

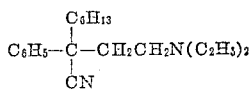

was prepared by a method similar to that described in Example 4, part (a). The reaction of 201.2 g. of alpha-phenylcaprylonitrile, 135.6 g. of diethylaminoethyl chloride and 48.4 g. of sodium amide gave 210 g. (70%) of phenyl-(n-hexyl)-diethylaminoethylacetonitrile, B. P. 138–142° C. (0.15 mm.); $n_D^{25}=1.4936$.

Its hydrochloride had the M. P. 103–105° C.

Anal. Calcd. for $C_{20}H_{33}N_2Cl$: N, 8.31; Cl, 10.52. Found: N, 8.30; Cl, 10.70.

(c) N,N-diethyl-3-phenylnonylamine,

was prepared by a method similar to that described in Example 3, part (c). The reaction of 60 g. of phenyl-(n-hexyl)-diethylaminoethylacetonitrile and 31.2 g. of sodium amide gave 39.4 g. of N,N-diethyl-3-phenylnonylamine, B. P. 126–130° (1.0 mm.); $n_D^{25}=1.4860$.

The hydrochloride was prepared by the usual alcoholic hydrogen chloride-ether procedure; 33.6 g. of free base gave 24.5 g. of hydrochloride, M. P. 87.5–89° C. It was recrystallized by dissolving in 30 cc of anhydrous ethanol and adding 100 cc. of anhydrous ether to give a pure sample of the hydrochloride, M. P. 89–89.5° C.

Anal. Calcd. for $C_{19}H_{34}NCl$: N, 4.49; Cl, 11.33. Found: N, 4.56; Cl, 11.17.

*Example 13*

(a) Phenyl-n-hexyl-(N-piperidylethyl)-acetonitrile,

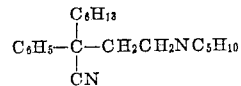

was prepared by a method similar to that described in Example 4, part (a). The reaction of 149.2 g. of alpha-phenylcaprylonitrile, 118.2 g. of piperidylethyl chloride and 45.0 g. of sodium amide gave 113 g. of phenyl-n-hexyl-(N-piperidylethyl)-acetonitrile, B. P. 165–170° C. (1 mm.).

(b) N-(3-phenylnonyl)-piperidine,

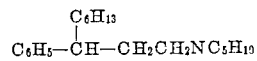

was prepared by a method similar to that described in Example 3, part (c). The reaction of 87.6 g. of phenyl-n-hexyl-(N-piperidylethyl)-acetonitrile and 43 g. of sodium amide gave 62.8 g. (78%) of N-(3-phenylnonyl)-piperidine, B. P. 124–132° C. (1 mm.); $n_D^{25}=1.5010$.

The hydrochloride was prepared by the usual alcoholic hydrogen chloride-ether procedure; 21.5 g. of the free base gave 21.1 g. of hydrochloride, M. P. 179–180° C. Recrystallization from isopropyl alcohol, using ether as a precipitant gave a pure sample of the hydrochloride, M. P. 180–180.5° C.

Anal. Calcd. for $C_{21}H_{33}N_2Cl$: C, 74.15; H, 10.58; N, 4.32. Found: C, 73.90; H, 10.50; N, 4.32.

*Example 14*

(a) Phenyl-(2-methylallyl)-acetonitrile was prepared by a method similar to that used for the preparation of phenylisobutylacetonitrile, described in Example 3, part (a). The reaction of 292.5 g. of benzyl cyanide, 226.5 g. of 2-methylallyl chloride and 115 g. of sodium amide gave a mixture of mono- and disubstituted products which were separated by repeated fractionation through an efficient packed and heated Vigreux column until a fraction boiling at 123–131° C. (5 mm.); $n_D^{25}=1.5185$, was obtained; total yield about 145 g.

(b) Phenyl-(2-methylallyl)-(N-piperidylethyl)-acetonitrile,

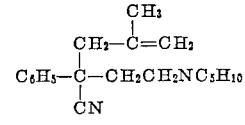

was prepared by a method similar to that described in Example 4, part (a). The reaction of 146.2 g. of phenyl-(2-methylallyl)-acetonitrile, 144.8 g. of piperidylethyl chloride and 60 g. of sodium amide gave 174 g. of phenyl-(2-methylallyl)-(N-piperidylethyl)-acetonitrile, B. P. 141–150° C. (1 mm.); $n_D^{25}=1.5258$.

The hydrochloride had the M. P. 213–214° C.

Anal. Calcd. for $C_{19}H_{27}N_2Cl$: C, 71.56; H, 8.54; N, 8.79. Found: C, 71.65; H, 8.51; N, 8.64.

(c) N-(5-methyl-3-phenyl-5-hexenyl)-piperidine,

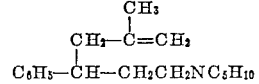

was prepared by a method similar to that described in Example 3, part (c). The reaction of 65.8 g. of phenyl-(2-methylallyl)-(N-piperidylethyl)-acetonitrile and 36.3 g. of sodium amide gave 29 g. of N-(5-methyl-3-phenyl-5-hexenyl)-piperidine, B. P. 102–114° C. (1.0 mm.);

$$n_D^{25} = 1.5200$$

The hydrochloride was prepared by the usual alcoholic hydrogen chloride-ether procedure; when recrystallized from isopropyl alcohol, the hydrochloride melted at 199–200° C.

Anal. Calcd. for $C_{18}H_{28}NCl$: C, 73.56; H, 9.60; N, 4.76. Found: C, 72.77; H, 9.26; N, 4.59.

*Example 15*

(a) Phenyl - (2 - methyl - 1 - propenyl) - (N-piperidylethyl)-acetonitrile,

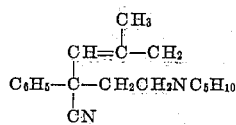

was prepared by a method similar to that described in Example 3, part (b). The reaction of 85.6 g. of isobutylidene-phenylacetonitrile [Murray and Cloke, J. Am. Chem. Soc. 58, 2016 (1936)], 92 g. of piperidylethyl chloride hydrochloride and 50 g. of sodium amide gave 106 g. (75%) of phenyl - (2 - methyl - 1 - propenyl) - (N - piperidylethyl)-acetonitrile, B. P. 136–139° C. (0.05 mm.); $n_D^{25} = 1.5260$.

Its hydrochloride had the M. P. 203–204.5° C.
Anal. Calcd. for $C_{19}H_{27}N_2Cl$: Cl, 11.12; N, 8.79. Found: Cl, 11.12; N, 8.60.

Its methiodide had the M. P. 199.5–201° C.
Anal. Calcd. for $C_{20}H_{28}N_2I$: N, 6.60; I, 29.91. Found: N, 6.48; I, 29.85.

(b) N - (5 - methyl - 3 - phenyl - 4 - hexenyl) - piperidine,

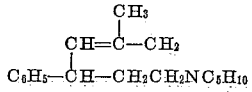

was prepared by a method similar to that described in Example 3, part (c). The reaction of 70.8 g. of phenyl-(2-methyl-1-propenyl)-(N-piperidylethyl)-acetonitrile and 45 g. of sodium amide gave 33 g. of N-(5-methyl-3-phenyl-4-hexenyl)-piperidine, B. P. 114–116° C. (0.05 mm.); $n_D^{25} = 1.5195$.

The hydrochloride was prepared by the usual alcoholic hydrogen chloride-ether procedure; 33 g. of the free base gave 30 g. of hydrochloride, M. P. 195.5–197° C. Recrystallization from anhydrous alcohol using anhydrous ether as a precipitant gave a pure sample of the hydrochloride, M. P. 198–200° C. Absorption spectra data indicated no conjugation of the double bond with the phenyl ring.

Anal. Calcd. for $C_{18}H_{28}NCl$: C, 73.56; H, 9.60; Cl, 12.07. Found: C, 73.41; H, 9.60; Cl, 11.90.

N - (5 - methyl - 3 - phenyl - 4 - hexenyl) - piperidine was converted to its methiodide by a method similar to that described in Example 3, part (c); 10.3 g. of the free base and 9 g. of methyl iodide gave 14.6 g. of the methiodide, M. P. 123.5–125° C. Recrystallization from an ethyl acetate-methanol mixture gave a pure sample of the methiodide, M. P. 127.5–129.5° C.

Anal. Calcd. for $C_{19}H_{30}NI$: C, 57.14; H, 7.57; I, 31.78. Found: C, 57.43; H, 7.59; I, 31.60.

We claim:

1. A member of the group consisting of a compound of the formula

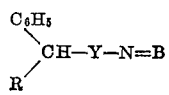

wherein R is a member of the group consisting of alkyl and alkenyl radicals of 4–6 carbon atoms and 5–6-membered cycloalkyl radicals, Y is a lower alpha,beta-alkylene radical, and —N=B is a member of the group consisting of di-lower-alkylamino, piperidino, morpholino and pyrrolidino groups; and water-soluble, non-toxic salts thereof.

2. A compound of the formula

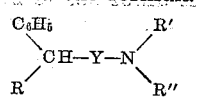

wherein R is cyclohexyl, Y is a lower alpha,beta-alkylene radical, and R' and R'' are lower alkyl radicals.

3. A compound of the formula

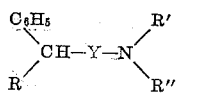

wherein R is an alkyl radical of 4–6 carbon atoms, Y is a lower alpha,beta-alkylene radical, and R' and R'' are lower alkyl groups.

4. N-(5-methyl - 3 - phenylhexyl) - piperidine having the formula

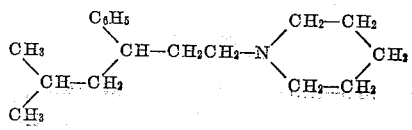

5. The process for preparing a compound of the formula

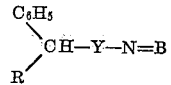

where R is a member of the group consisting of alkyl and alkenyl radicals of 4–6 carbon atoms, and 5–6-membered cycloalkyl radicals, Y is a lower alpha,beta-alkylene radical, and —N=B is a member of the group consisting of di-lower-alkylamino, piperidino, morpholino and pyrrolidino groups, which comprises alkylating a compound of the formula

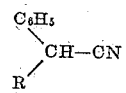

with an aminoalkyl halide of the formula X—Y—N=B, wherein X is halogen, in the presence of sodium amide, and subsequently replacing the cyano group with hydrogen by heating with sodium amide.

6. A compound of the formula

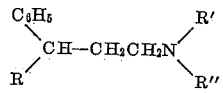

wherein R is an alkyl radical of 4–6 carbon atoms, and R' and R'' are lower alkyl groups.

7. The method of preparing 1-phenyl-1-cyclohexyl-3-piperidinopropane which comprises the steps of alkylating pentylcyclohexylacetonitrile with a piperidinoethyl halide in the presence of sodamide and subsequently replacing the cyano group with hydrogen by heating the resulting phenylcyclohexylpiperidinoethylacetronitrile with sodamide.

8. A compound of the formula

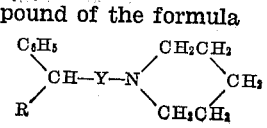

wherein R is cyclohexyl and Y is a lower alpha,-beta-alkylene radical.

9. A compound of the formula

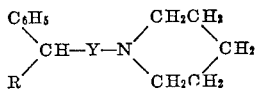

wherein R is an alkyl radical of 4–6 carbon atoms and Y is a lower alpha,beta-alkylene radical.

10. A compound of the formula

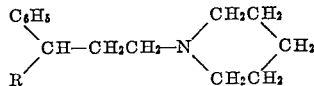

wherein R is an alkyl radical of 4–6 carbon atoms.

11. The process of preparing a compound of the formula

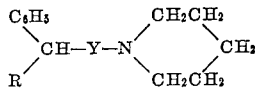

wherein R is an alkyl radical of 4–6 carbon atoms and Y is a lower alpha,beta-alkylene radical, which comprises alkylating a compound of the formula

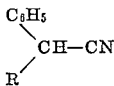

with a piperidinoalkyl halide of the formula X—Y—NC₅H₁₀, wherein X is halogen, in the presence of sodium amide, and subsequently replacing the cyano group with hydrogen by heating with sodium amide.

12. The process for preparing a compound of the formula

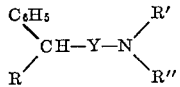

wherein R is cyclohexyl, Y is a lower alpha,beta-alkylene radical, and R' and R" are lower-alkyl radicals, which comprises alkylating phenylcyclohexylacetonitrile with an aminoalkyl halide of the formula X—Y—NR'R", wherein X is halogen, in the presence of sodium amide, and subsequently replacing the cyano group with hydrogen by heating with sodium amide.

13. The process for preparing 1-phenyl-1-isobutyl-3-piperidinopropane, which comprises alkylating phenylisobutylacetonitrile with a piperidinoethyl halide in the presence of sodamide and subsequently replacing the cyano group with hydrogen by heating the resulting phenylisobutylpiperidinoethylacetonitrile with sodamide.

14. 1-phenyl-1-cyclohexyl-3-(1-piperidino)-propane.

15. 1-phenyl-1-cyclohexyl-3-(1-piperidino)-propane hydrochloride.

16. 3-phenyl-3-cyclohexylpropyldimethylamine having the formula

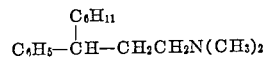

17. N,N-diethyl-5-methyl-3-phenylhexylamine having the formula

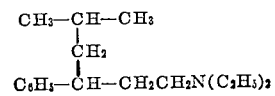

18. A compound of the formula

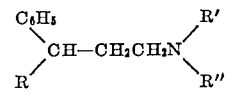

wherein R is cyclohexyl and R' and R" are lower alkyl radicals.

19. The process of preparing a compound of the formula

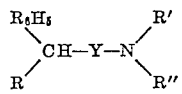

wherein R is an alkyl radical of 4–6 carbon atoms, Y is a lower alpha,beta-alkylene radical, and R' and R" are lower-alkyl groups, which comprises alkylating a compound of the formula

with a dialkylaminoalkyl halide of the formula X—Y—NR'R", wherein X is halogen, in the presence of sodium amide, and subsequently replacing the cyano group with hydrogen by heating with sodium amide.

20. The process of preparing a compound of the formula

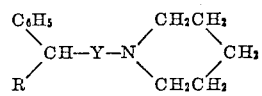

wherein R is cyclohexyl and Y is a lower alpha,-beta-alkylene radical, which comprises alkylating a compound of the formula

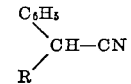

with a piperidinoalkyl halide of the formula X—Y—NC₅H₁₀, wherein X is halogen, in the presence of sodium amide, and subsequently replacing the cyano group with hydrogen by heating with sodium amide.

ARLO WAYNE RUDDY.
MAURICE L. TAINTER,
*Administrator of the estate of Theodore J. Becker, deceased.*

References Cited in the file of this patent

UNITED STATES PATENTS

| Number | Name | Date |
|---|---|---|
| 1,793,176 | Klarer et al. | Feb. 17, 1931 |
| 2,410,469 | Van Zoeren | Nov. 5, 1946 |
| 2,446,522 | Bockmuhl | Aug. 10, 1948 |

FOREIGN PATENTS

| Number | Country | Date |
|---|---|---|
| 307,305 | Great Britain | June 4, 1930 |
| 884,569 | France | Apr. 27, 1943 |

OTHER REFERENCES

Suter et al.: Jour. Amer. Chem. Soc., vol. 64 (1942), pp. 533–6.

Cohen et al.: Jour. Chem. Soc. (London), vol. 107 (1915), pp. 901 and 902.

Mannich: Ber. der Deu. Chem., vol. 69 (1936), p. 2113.